C. B. LONGSTRETH.
COMPUTING SCALE ILLUMINATING DEVICE.
APPLICATION FILED AUG. 22, 1908.
946,447.
Patented Jan. 11, 1910.
2 SHEETS—SHEET 1.
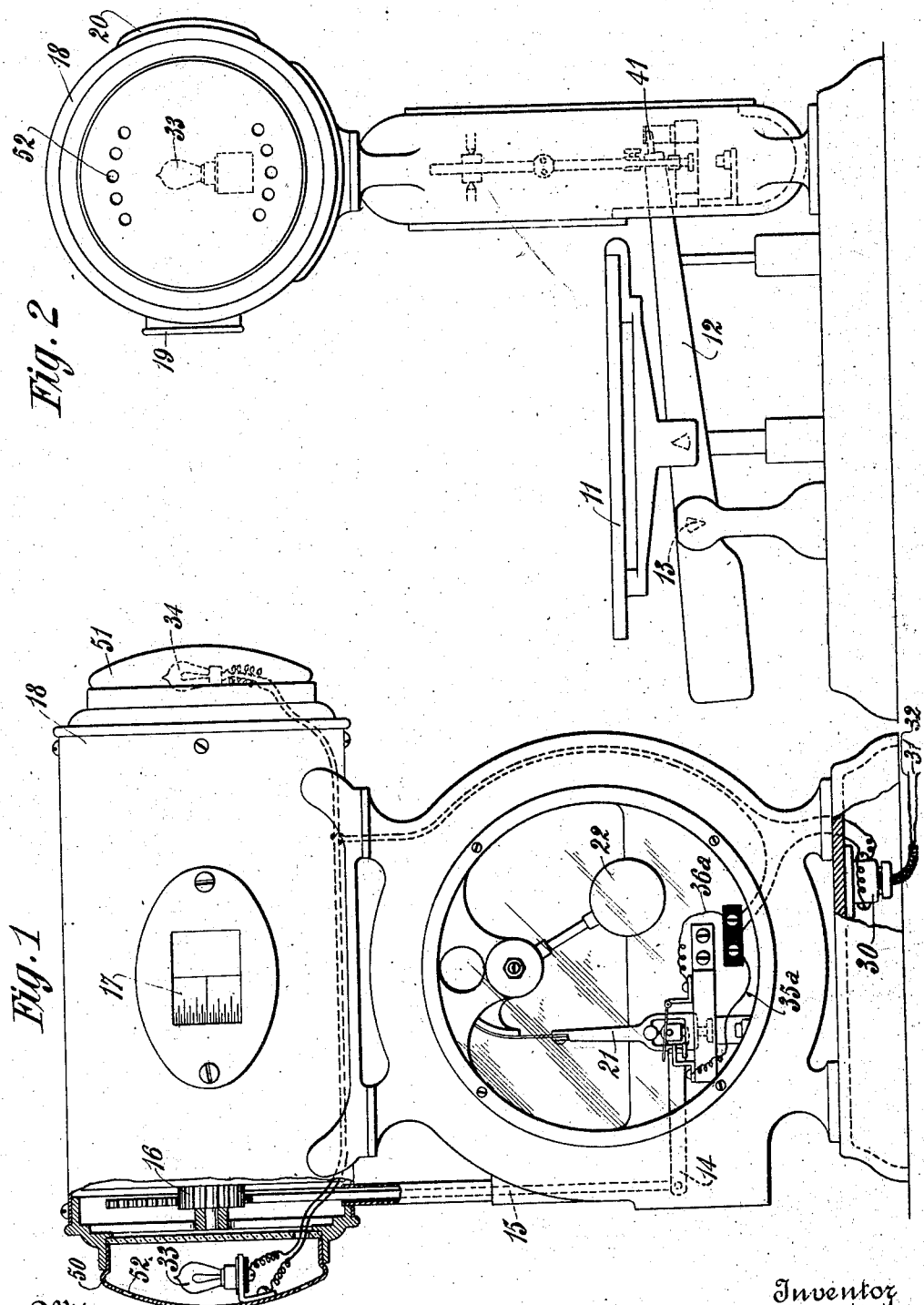

C. B. LONGSTRETH.
COMPUTING SCALE ILLUMINATING DEVICE.
APPLICATION FILED AUG. 22, 1908.
946,447.
Patented Jan. 11, 1910.
2 SHEETS—SHEET 2.
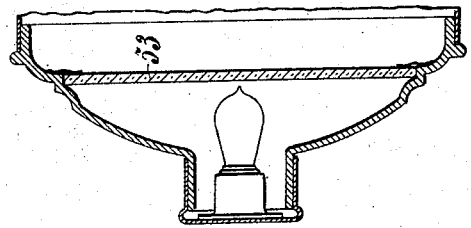
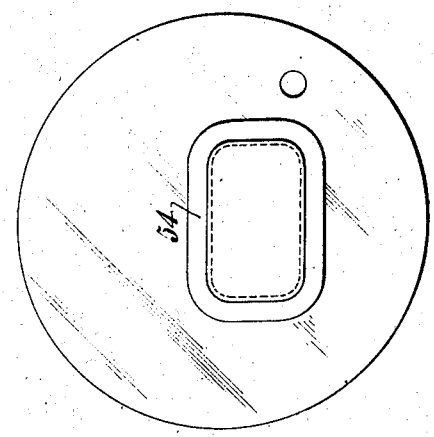
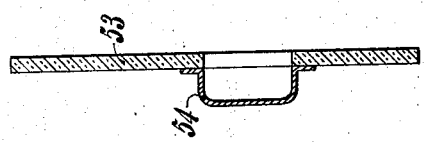
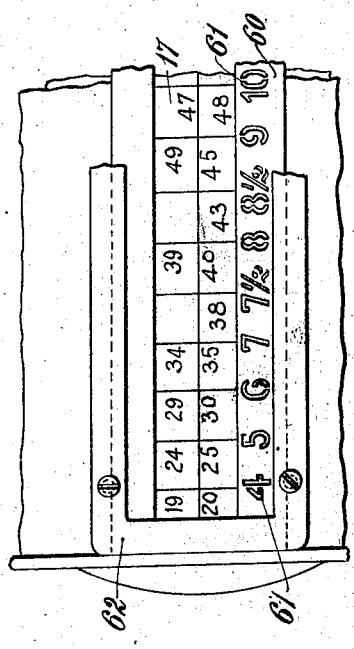
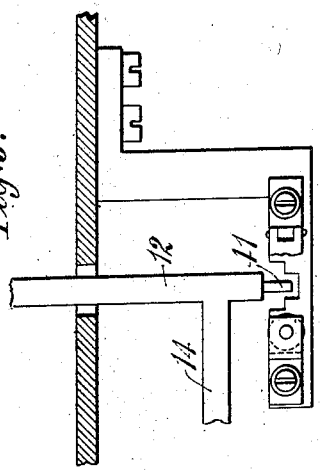
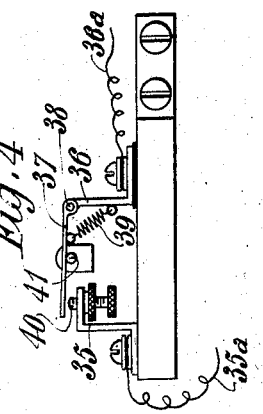
Witnesses:
Raphail Netter
W. H. Linderman
Inventor
Charles B. Longstreth
By his Attorneys
Kerr, Page, Cooper + Hayward

UNITED STATES PATENT OFFICE.

CHARLES BENJIMAN LONGSTRETH, OF DAYTON, OHIO, ASSIGNOR OF ONE-THIRD TO HENRY B. PRUDEN AND ONE-THIRD TO EARL R. LINES, BOTH OF DAYTON, OHIO.

COMPUTING-SCALE-ILLUMINATING DEVICE.

946,447.  Specification of Letters Patent.  Patented Jan. 11, 1910.

Application filed August 22, 1908. Serial No. 449,803.

*To all whom it may concern:*

Be it known that I, CHARLES BENJIMAN LONGSTRETH, a citizen of the United States, residing at Dayton, county of Montgomery, and State of Ohio, have invented a certain new and useful Improvement in Computing-Scale-Illuminating Devices, of which the following is a specification, reference being had to the accompanying drawings forming a part of the same.

This invention relates to improvements in illuminating devices for computing or weighing scales, and among the various objects of the invention are to provide an illuminating lamp or apparatus which will be automatically controlled by the scale for the purpose of the illumination thereof; also to provide such interior illumination of the reading or chart portion of the scale as will assist the operator or the customer in observing the operation of the scale; also so to locate the lamp as to prevent as much as possible the heat from being radiated to the operative parts of the scale.

With these and incidental objects in view, the invention consists of certain novel features of construction and combinations of parts, all as set forth in the appended claims and a preferred form of embodiment of which is hereinafter specifically described with reference to the accompanying drawings.

The invention is shown as applied in one particular form to the computing scale now well known on the market under the name of the "Toledo," which scale is described as to its general construction and operation in patent to De Vilbiss No. 839,736, dated December 25, 1906, to which patent reference may be had for such details of general operation as are not fully described herein. It will be understood, however, that the invention is not limited to this particular form of scale, but is applicable as well to various other forms of scales, to any one of which these improvements may be applied without departing from the spirit of the present invention.

In computing scales in particular, it has heretofore been very difficult to secure a proper reading on the computing chart, owing to the necessarily small figures contained on the chart, and the fact that ordinarily these scales are located in such places in their establishment as not to afford adequate light from the outside to assist in the reading operation. This disadvantage has been attempted to be remedied by the use of mirrors arranged to be freely shifted about various pivotal points for the purpose of throwing their reflecting light upon the reading openings where the scale computations are exposed.

The present invention is designed to remedy these defects. It dispenses with the use of any such mirrors and gives an illumination which shines through a transparent chart marked with the various computations, and the device is also automatically arranged so as to light up the chart at each operation of the scale.

In the drawings Figure 1 represents a rear elevation of a computing scale, including the improvements above mentioned. Fig. 2 represents a side elevation of the same with certain parts omitted for the sake of clearness. Figs. 3 and 4 represent respectively detailed plan and elevations of the electric switch mechanism. Figs. 5, 6 and 7 represent details of the end-piece construction for holding the electric lamp. Fig. 8 represents a detailed view of a portion of the computing chart of the scale, including the auxiliary chart for price per unit weight.

Referring to the said drawings, the scale is provided with the usual scale pan 11, which oscillates the scale lever 12 about the pivot point 13. The lever 12 is connected by an arm 14 to a rack 15 of the machine and thereby with a pinion 16 mounted upon the axis of a revoluble cylinder, which cylinder is provided with a transparent computing chart 17 bearing the usual indicia indicating the computing value of the article weighed in a well known manner. This revoluble computing chart or cylinder 17 is suitably mounted in the casing 18 which has formed in it two reading openings 19 and 20, and for indicating at front and back. The rear end of the lever 12 engages the stirrup-like end of a depending arm 21 connected with a weight 22, so that when any article to be weighed is placed upon the scale pan 11, the rearward end of the lever 12 descends and tends to pull the weight 22 upward. The construction of these mechanical parts is well known in the form of scale referred to, and the operation of the same is set forth more in detail in the De Vilbiss patent cited.

The illuminating device will now be described.

Mounted at any suitable place on the standard of the scale is a plug 30, to which lead electric wires 31, 32 providing a source of electrical energy, from battery or electric light line or other source. From this plug connecting wires lead upward through the framework of the scale, as shown in dotted lines in Fig. 1 to include in their circuit two electric lamps 33 and 34 situated within the end pieces of the scale barrel, as later referred to. There is also included in this electric circuit an electric switch automatically operated by the scale. The switch comprises terminals which consist of a conductor arm 35 and a conductor plate 36, more clearly shown in detail in Fig. 4. These terminals are connected in the circuit by the wires 35ª and 36ª respectively. The terminal 36 is connected to a movable contact strip 37 hinged at 38, which strip normally tends to assume contact-making position against the other contact of the switch by reason of its own weight or assisted by the spring 39. The other contact of the switch comprises a setscrew 40 threaded into the terminal 35 so that the hinged strip 37 will tend to drop down upon the contact point 40 and complete the electric circuit through the electric lamps. This switch device is screwed on to the rearward end of the scale, as shown in Figs. 1 and 2, and is suitably insulated from the metal work of the scale.

There projects from the rear end of the scale lever 12 a pin 41 which extends under the contact strip 37, and when the scale is in normal zero position the pin 41 holds the strip 37 out of contact-making position away from its opposite contact.

When the scale is operated by any article being placed upon the scale pan for the purpose of weighing, and the rear end of the lever 12 thereby descends, the pin 41 in descending drops away from the contact strip 37 and permits it to assume its normal contact-making position, resting against its opposite contact 40 to close the electric circuit and illuminate the electric lamps. This construction of the switch, it will be observed, is such as to permit the continued movement of the scale lever independently of the contact device, so that there is no further interference with the action of the scale in connection with the making of this circuit.

When the scale returns to its normal position after its operation of weighing, the pin 41 of course returns to the normal upper position and lifts the contact strip 37 to break the electric circuit and extinguish the lamps. It is thus obvious that the contact strip 37 is allowed to strike the contact setscrew 40 and thereby cause lighting of the lamps at a certain point of displacement of the lever 12 downward from normal position. The contact 40 is made in the form of a setscrew in order to permit the upper end of the screw to be raised and lowered, and thereby vary the relation between the contact strip 37 and the contact point 40 so as to vary the point at which the lighting circuit is made or broken. This adjustment by changing the position of the contact 40 thereby causes the scale lever 12 to control the movable contact strip 37 over a greater or less extent of the movement of the lever 12. The result of this construction is that the scale may be adjusted to cause the lighting of the lamp to take place at any desired point of displacement of the scale lever downward, so that a small oscillation of the scale lever in the vicinity of its normal zero position will not light and extinguish the lamp, and it likewise permits the adjustment of the lamp lighting to take place properly timed in connection with the initial adjustment of the scale lever to set the scale lever at its zero position before the scale is put in use for weighing.

Of course other switch means could be utilized in various forms for automatically controlling the electric circuit by means of the scale lever, or any one of the various movable elements of the scale other than the scale lever 12 could be utilized to automatically control the illumination of the illuminating apparatus, all of which various forms would come within the scope of the present invention.

It is an advantage in the present construction to have the switch or contact device interfere as little as possible with the scale elements in order not to affect the scale in its weighing operation. This particular contact device has the advantage that it is in connection with the movable scale elements only for a short time, and for the greater part of the movement of the scale it is disconnected therefrom. The movable contact strip normally tends to make connection with its opposite contact independently of the scale lever 12 so that the scale lever does not have to do any work in positively moving the strip into contact-making position, but instead simply holds the contact strip out of contact-making position during the small extent of movement in the vicinity of the zero position of the scale lever.

As above stated, the upper barrel of the scale comprises the casing 18 within which is the revolving cylindrical chart 17 carrying the computation figures. This cylinder is closed by the bulging end pieces 50 and 51, within which are mounted respectively the electric lamps 33 and 34. This location of the lamps is important because it is desirable to have the light therefrom shine interiorly within the computing chart cylinder to illuminate the transparent chart at the reading openings; and at the same time it is important to have the lamp so located as to permit free movement of the revolving cylinder, and likewise be in such a position that it will not affect the operation of the scale by the undue radiation of heat by the lamp to the operating parts. This location of the lamps in this particular manner within the above-described end-pieces of the cylinder accomplishes the results, and has the advantages set forth. Of course a single lamp may be used in one of the end-pieces, or both end-pieces may be supplied with lamps.

In order to assist still further in the matter of preventing excess of heat radiating from the lamps, the ends may be formed with apertures 52 (see Figs. 1 and 2) to permit access of air within the cylinder for cooling purposes; and furthermore a glass partition 53 (see Figs. 1 and 7) may be utilized, mounted in the end-piece and intervening between the lamp and the interior of the chart cylinder.

Figs. 5 and 6 show another form of glass partition 53 which may be provided with a cup-shaped receptacle 54 within which to mount the electric lamp, the receptacle 54 being of metal or other suitable material and cemented to the glass or attached in any other desired manner.

In computing scales of this sort it is not only difficult to read the figures upon the computing chart in the absence of a good light, but it is also difficult to read the figures indicating the price per unit weight, these latter figures being used in connection with the computations on the chart in a well known manner. I have therefore provided an auxiliary chart 60 adjacent to the computing chart, and having perforated figures 61 representing the price per pound, so that with this arrangement the illumination of the lamp not only serves to light up the transparent computing chart, but it also shines through these perforated figures on the auxiliary chart and clearly shows to the operator the figures representing the price per pound. It will be understood that this price per pound chart lies along the front of one of the reading openings adjacent to the computing chart 17, and it may be suitably held in place by an overlying strip 62.

Having thus described my invention in the specific form of mechanism which I have found suitable, it is nevertheless to be understood that the particular form described is only a preferred form of embodiment of the invention and various other forms might be used, all coming within the scope of the claims which follow.

Any form of illuminating means might be used other than electric lamps, and automatic control of the illumination may, as above stated, be effected from any one of the various parts of the scale; and various other kinds of switch or contact-making devices may be used in connection with this control of the illumination.

What is claimed is as follows:

1. In an illuminating device for computing scales, the combination with the weighing elements of the scale, of a transparent cylindrical computing chart actuated by said weighing elements; an inclosing case for said chart having a reading opening; end pieces for inclosing the ends of said cylinder, said end pieces being formed with apertures to permit access of air for cooling; electric lamps mounted on the inner side of the end-pieces whereby to cast the light interiorly within the cylinder while permitting free movement of the chart and its operating mechanism unhindered by contact with or heat from the lamp; a glass partition for the lamp mounted in the end-piece and intervening between the lamp and the interior of the cylinder; and an electric circuit for lighting the lamp to cause illumination of the transparent chart at the reading opening.

2. In an illuminating device for computing scales, the combination with a transparent computing chart having computing indicia thereon and coöperating with the weighing elements of a scale to show computed values, an auxiliary chart adjacent said computing chart and formed with perforated figures indicating price per unit weight; an illuminating lamp located back of said computing chart and said auxiliary chart; and means for lighting said lamp to cause it to shine through said transparent computing chart and through the perforated figures on said adjacent auxiliary chart.

3. In an illuminating device for computing scales, the combination with the weighing elements of the scale, of a transparent computation chart, and connections to said weighing elements coöperating with said chart for indicating the computation values; a hollow casing inclosing said chart, but constructed to expose the reading surface thereof to view; a bulging end-piece for said casing forming an enlarged end chamber therefor; an electric lamp mounted on the inner side of the bulging end piece within said chamber whereby to cast the light interiorly within the chart while permitting free movement of the scale parts; a transparent wall intervening between said end chamber and the interior of said chart for heat protection; and an electric circuit for lighting the lamp to cause illumination of the transparent chart at its reading portion.

4. In an illuminating device for computing scales, the combination with a computation chart supported in the framework of the machine, an illuminating electric lamp therefor, and a circuit for said lamp; of a scale lever having connections coöperating with said chart to determine the computed values, the outer extremity of said lever being extended longitudinally to form a projecting pin extending beyond the point of attachment of said lever connections and into proximity to the framework of the machine; and a switch for said lamp circuit mounted on said framework at the outer end of said lever and in juxtaposition to the said pin and comprising a stationary contact terminal and a movable contact terminal, the latter extending across the path of travel of said pin and lifted thereby when the scale lever is in normal position, substantially as and for the purpose described.

CHARLES BENJIMAN LONGSTRETH.

Witnesses:
JOHN GEORGE SCHAUER,
JOSEPH SCHAUER.